US007552098B1

(12) United States Patent
Haffner

(10) Patent No.: US 7,552,098 B1
(45) Date of Patent: Jun. 23, 2009

(54) METHODS TO DISTRIBUTE MULTI-CLASS CLASSIFICATION LEARNING ON SEVERAL PROCESSORS

(75) Inventor: Patrick Haffner, Atlantic Highlands, NJ (US)

(73) Assignee: AT&T Corporation, Bedminster, NJ (US)

( * ) Notice: Subject to any disclaimer, the term of this patent is extended or adjusted under 35 U.S.C. 154(b) by 126 days.

(21) Appl. No.: 11/324,011

(22) Filed: Dec. 30, 2005

(51) Int. Cl.
*G06E 1/00* (2006.01)
*G06E 3/00* (2006.01)
*G06F 15/18* (2006.01)
*G06G 7/00* (2006.01)

(52) U.S. Cl. .......................................................... 706/20
(58) Field of Classification Search ........................ None
See application file for complete search history.

(56) References Cited

U.S. PATENT DOCUMENTS

| | | | | |
|---|---|---|---|---|
| 5,845,113 | A * | 12/1998 | Swami et al. ................... | 707/7 |
| 6,442,519 | B1 * | 8/2002 | Kanevsky et al. .............. | 704/243 |
| 6,606,620 | B1 * | 8/2003 | Sundaresan et al. ............ | 707/3 |
| 6,658,658 | B1 * | 12/2003 | Jones et al. ................... | 717/162 |
| 6,665,644 | B1 * | 12/2003 | Kanevsky et al. .............. | 704/275 |
| 6,850,252 | B1 * | 2/2005 | Hoffberg ...................... | 715/716 |
| 6,964,023 | B2 * | 11/2005 | Maes et al. ................... | 715/811 |
| 7,092,888 | B1 * | 8/2006 | McCarthy et al. ............. | 704/277 |
| 7,139,717 | B1 * | 11/2006 | Abella et al. ................. | 704/275 |
| 7,167,832 | B2 * | 1/2007 | Abella et al. ................. | 704/275 |
| 7,280,968 | B2 * | 10/2007 | Blass .......................... | 704/266 |
| 7,403,899 | B1 * | 7/2008 | Abella et al. ................. | 704/275 |
| 7,437,344 | B2 * | 10/2008 | Peyrelevade ................. | 706/62 |

OTHER PUBLICATIONS

A real-time speech recognition architecture for a multi-channel interactive voice response system Trihandoyo, A.; Belloum, A.; Kun-Mean Hou; Acoustics, Speech, and Signal Processing, 1995. ICASSP-95., 1995 International Conference on vol. 4, May 9-12, 1995 pp. 2687-2690 vol. 4 Digital Object Identifier 10.1109/ICASSP. 1995.480115.*
Home telemonitoring of vital signs and cardiorespiratory signals in chronic heart failure patients Pinna, G.D.; Maestri, R.; Capomolla, S.; La Rovere, M.T.; Andrews, D.; Johnson, P.; Mortara, A.; Biomedical Engineering, 2003. IEEE EMBS Asian-Pacific Conference on Oct. 20-22, 2003 pp. 34-35 Digital Object Identifier 10.1109/APBME.2003.1302570.*
Home telemonitoring of chronic heart failure patients: novel system architecture of the home or hospital in heart failure study Pinna, G.D.; Maestri, R.; Roma, M.; Scanferlato, J.L.; Giordano, A.; Comazzi, F.; Ferrari, M.; Andrews, D.; Johnson, P.; Capomolla, S.; Mortara, A.; Computers in Cardiology, Sep. 21-24, 2003 pp. 105-108.*

(Continued)

*Primary Examiner*—Michael B Holmes
(74) *Attorney, Agent, or Firm*—Banner & Witcoff, Ltd.

(57) ABSTRACT

The time taken to learn a model from training examples is often unacceptable. For instance, training language understanding models with Adaboost or SVMs can take weeks or longer based on numerous training examples. Parallelization thought the use of multiple processors may improve learning speed. The invention describes effective methods to distributed multiclass classification learning on several processors. These methods are applicable to multiclass models where the training process may be split into training of independent binary classifiers.

11 Claims, 5 Drawing Sheets

OTHER PUBLICATIONS

Real Time Currents in the Harbors of the Great Lakes— A Pilot Project Earwaker, K.L.; Oceans 2007 Sep. 29, 2007-Oct. 4, 2007 pp. 1-7 Digital Object Identifier 10.1109/OCEANS.2007.4449260.*

A study on natural language call routing Lee, C.-H.; Carpenter, R.; Chou, W.; Chu-Carroll, J.; Reichl, W.; Saad, A.; Zhou, Q; Interactive Voice Technology for Telecommuncations Applications, 1998. IVTTA '98. Proceedings. 1998 IEEE 4th Workshop Sep. 29-30, 1998 pp. 37-42 Digital Object Identifier 10.1109/IVTTA.1998.727690.*

Hidden market models: a bystander's view of progress [computer telephony integration] Walters, R.; Advances in Interactive Voice Technologies for Telecommunication Services (Digest No. 1997/147), IEE Colloquium on Jun. 12, 1997 pp. 3/1-3/4.*

An automated stock price delivery system based on the GSM short message service Friel, D.; Kilmartin, L.; Communications, 1998. ICC 98. Conference Record. 1998 IEEE International Conference on vol. 3, Jun. 7-11, 1998 pp. 1591-1595 vol. 3 Digital Object Identifier 10.1109/ICC.1998.683092.*

Vehicle sound signature recognition by frequency vector principal component analysis Huadong Wu; Siegel, M.; Khosla, P.; Instrumentation and Measurement, IEEE Transactions on vol. 48, Issue 5, Oct. 1999 pp. 1005-1009 Digital Object Identifier 10.1109/19.799662.*

Thorsten Joachims, "Making Large-Scale SVM Learning Practical", published in Adavaces in Kernel Methods- Support Vector Learning, 1998. Retrieved from http://www.ai.cs.uni-dortmund.de/PERSONAL/joachims.html.

Hans Peter Graff, Eric Cosatto, Leon Bottou, Igor Durdanovic, Vladimir Vapnik, "Parallel Support Vector Machines: The Cascade SVM", In Advances in Neural Information Processing Systems, V 17, 2005. Retrieved from http://www.hpg,cosatto,leonb,igord,vlad@nec-labs.com.

V.N Vapnik, "Statistical Learning Theory", John Wiley & Sons, 1998.

Y. Freund and & R.E. Schapire, "Experiments with a New Boosting Algorithm", In proceedings of ICML 1996, pp. 148-156, 1996.

M. Dudik, S. Phillips & R.E. Schapire, "Performance Guarntees for Regularized Maximum Entropy Density Estimation", In proceedings of COLT 2004, Banff, Canada, 2004. Springer Verlag.

A.L. Berger, S.S. Della Pietra and & V.J. Della Pietra, "A Maximum Entropy Approach to Natural Language Processing", Computational Linguistics, 22(1):39-71, 1996.

P. Haffner, "Fast Transpose Methods for Sparse Kernel Learning on Sparse Data", 2005. Presented at NIPS 2005 Workshop on Large Scale Kernel Machines.

* cited by examiner

METHODS TO DISTRIBUTE MULTI-CLASS CLASSIFICATION LEARNING ON SEVERAL PROCESSORS

FIELD OF THE INVENTION

The present invention relates to increasing learning speed when a large number of binary classifiers need to be trained together.

BACKGROUND OF THE INVENTION

Large margin or regularized classifiers such as support vector machines (SVMs), Adaboost, and Maximum Entropy ((Maxent) in particular Sequential L1-Regularized Maxent) are obvious choices for use in semantic classification. (For additional information on these classifiers see Vladimir N. Vapnik. Statistical Learning Theory. John Wiley & Sons, 1998; see also Yoav Freund and Robert E. Schapire. Experiments with a New Boosting Algorithm. In Proceedings of ICML'96, pages 148-156, 1996; see also Miroslav Dudik, Steven Phillips, and Robert E. Schapire. Performance Guarantees for Regularized Maximum Entropy Density Estimation. In Proceedings of COLT'04, Banff, Canada, 2004. Springer Verlag; see also Miroslav Dudik, Steven Phillips, and Robert E. Schapire. Performance Guarantees for Regularized Maximum Entropy Density Estimation. In Proceedings of COLT'04, Banff, Canada, 2004. Springer Verlag.)

These linear classifiers are well known in the art as all three large margin or regularized classifiers offer learning processes that are scalable with runtime implementations that may be very efficient. These algorithms give users three ways to train a linear classifier using very different frameworks. Each of these algorithms may be used across multiple processors or clusters of computers (parallelization) to increase learning speed.

SVMs look for a separating hyperplane 1002 with a maximum separation margin 1010 between two classes, as shown in FIG. 1. A first set of classes 1006 and a second set of classes 1008 are separated on the separation hyperplane. The hyperplane 1002 can be expressed as a weight vector. The margin is the minimum distance between the projections of the points of each class on the direction of the weight vector. The maximum margin 1010 is shown in FIG. 1 as the distance between the first set of classes 1006 and the second set of classes 1008. FIG. 1 represents hard margin SVMs, where classification errors on the training set are not permitted. For discussion purposes in the remaining description of the invention, SVMs are generalized as soft margin SVMs, which allow some errors, i.e. vectors that are inside or on the wrong side of the margin.

AdaBoost incrementally refines a weighted combination of weak classifiers. AdaBoost selects at each iteration a feature k and computes, analytically or using line search, the weight wk that minimizes a loss function. In the process, the importance of examples that are still erroneous is "adaptively boosted", as their probability in a distribution over the training examples that is initially uniform is increased. Given a training set associating a target class $y_i$ to each input vector $x_i$, the AdaBoost sequential algorithm looks for the weight vector w that minimizes the exponential loss (which is shown to bound the training error):

$$C = \sum_{i=1}^{M} \exp(-y_i w^T x_i)$$

AdaBoost also allows a log-loss model, where the goal is to maximize the log-likelihood of the training data $\log(\pi_i P(y_i|x_i))$. The posterior probability to observe a positive example is $$P(y_i = 1 \mid x) = \frac{1}{1 + \exp(-w^T x_i)}$$

Finally, Maxent relies on probabilistic modeling. In particular, ones assumes that the classification problem is solved by looking for the class y which maximizes a distribution argmax P(y|x). (See; Adam L. Berger, Stephen A. Della Pietra, and Vincent J. Della Pietra. A maximum entropy approach to natural language processing. Computational Linguistics, 22(1):39-71, 1996.)

First, how well this distribution matches the training data is represented by constraints which state that features must have the same means under the empirical distribution (measured on the training data) and under the expected distribution (obtained after the training process). Second, this distribution must be as simple as possible. This can be represented as a constrained optimization problem: find the distribution over training samples with maximum entropy that satisfies the constraints. Using convex duality, one obtains as a loss function the Maximum Likelihood. The optimization problem is applied to a Gibbs distribution, which is exponential in a linear combination of the features:

$$P(x) = \frac{\exp(w^T x)}{Z}$$

with $Z = \sum_{i=1}^{M} \exp(w^T x_i)$.

Sequential L1-Regularized Maxent is one of the fastest and most recent algorithms to estimate Maxent models. It offers a sequential-update algorithm which is particularly efficient on sparse data and allows the addition of L1-Regularization to better control generalization performance.

AdaBoost, which is large margin classifier and implicitly regularized, and Maxent, which is explicitly regularized, have also been shown, both in theory and experimentally, to generalize well in the presence of a large number of features. Regularization favors simple model by penalizing large or non-zero parameters. This property allows the generalization error, i.e. the error on test data, to be bounded by quantities which are nearly independent of the number of features, both in the case of AdaBoost and Maxent. This is why a large number of features, and consequently a large number of classifier parameters, do not cause the type of overfitting (i.e. learning by heart the training data) that used to be a major problem with traditional classifiers.

All of the above algorithms have shown excellent performance on large scale problems. Adaboost and Maxent are particularly efficient when the data is sparse, that is when the proportion of non-zero input features is small. Their learning scales linearly as a function of the number of training samples N. Support Vector Machines, whose classification capacity is more powerful, has a learning time in theory slower, with a learning time that scales quadratically in N. A recent breakthrough has considerably improved SVM speed on sparse data. (See; Haffner. Fast transpose methods for sparse kernel learning, 2005. Presented at NIPS'05 workshop on Large Scale Kernel Machines).

However, these computationally expensive learning algorithms cannot always handle the very large number of examples, features, and classes present in the training corpora that are available. For example, in large scale natural language processing, network monitoring, and mining applications, data available to train these algorithms can represent millions of examples and thousands of classes. With this amount of data, learning times may become excessive.

Furthermore, large margin classifiers were initially demonstrated on binary classification problems, where the definition of the margin is unambiguous and its impact on generalization is reasonably well understood. The simplest multiclass classification scheme is to train C binary classifiers, each trained to distinguish the examples belonging to one class from examples not belonging to this class. The situation where each example can only belong to one class leads to training one class versus all other classes. That is why this scheme is referred to as 1-vs-other or 1-vs-all. However, many other combinations of binary classifiers are possible, in particular 1-vs-1 (also called all-vs-all) where each classifier is trained to separate a pair of classes.

Current methods used to improve learning speed focus on a single binary classifier. However, these current methods do not guarantee a global optimal solution for different classifiers. Furthermore, current runtimes are unacceptable when processing a large number of examples with numerous classes. The run time of a deployed system should be on the order of milliseconds. A manageable learning time should be in the order of hours, with memory requirements not exceeding a few gigabytes. To remain within these constraints, one is often led to choose sub-optimal solutions.

Therefore, there is a need in the art for methods in which learning times are improved for large margin classifiers. Such methods may be used in interactive voice response systems or other systems requiring the handling of a large number of examples or features.

SUMMARY

Aspects of the present invention overcome problems and limitations of the prior art by providing methods for increasing learning speed of large margin classifiers. A first set of methods in accordance with various aspects of the invention consists of identifying processing steps that may be shared between all binary classifiers. These methods may preprocess training data or examples before classification. A second set of methods in accordance with various aspects of the invention focus on parallelization of the large margin classifiers. In an aspect of the invention, the parallelization of the large margin classifiers does not require communication between computing units, and are suitable for loosely connected networks such as described in FIG. 2. These methods are applicable to multiclass models where the training process may be split into training of independent binary classifiers.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Exemplary Operating Environment

Figure 1:
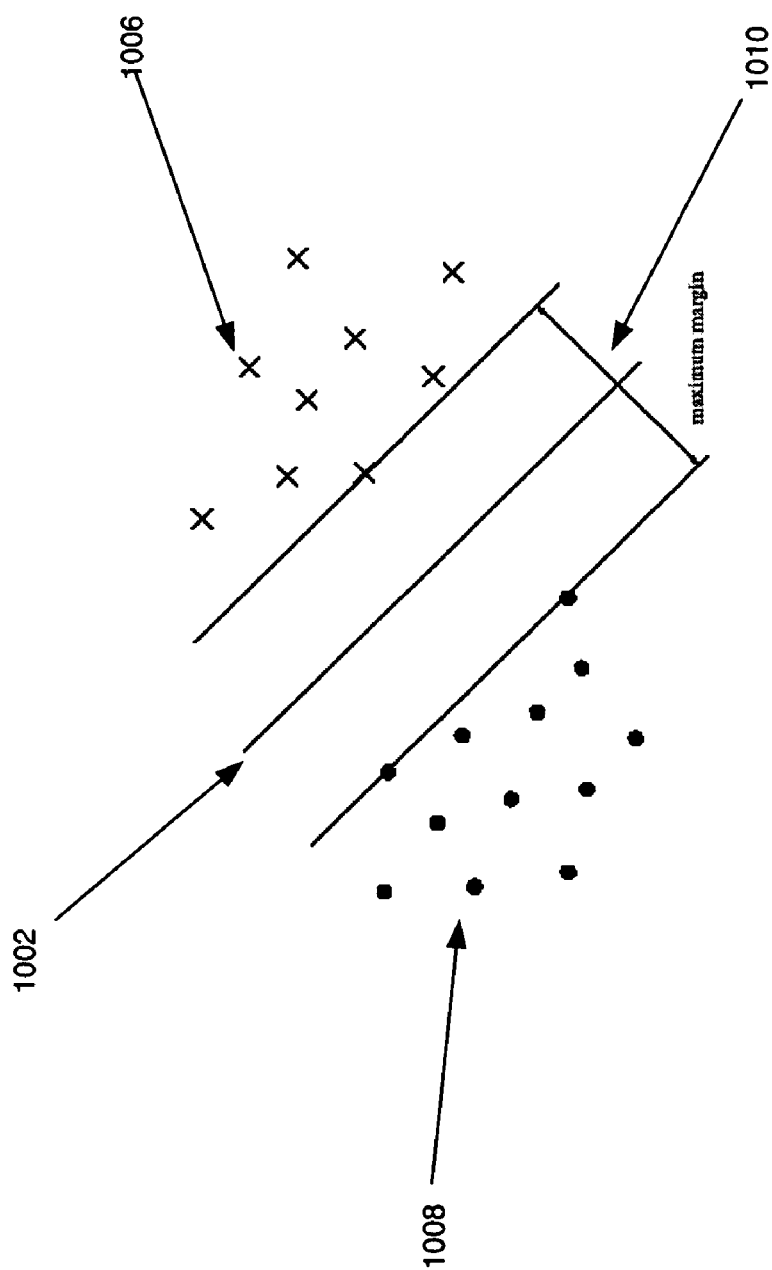
FIG. 1 illustrates large margin separation between two classes in accordance with an embodiment of the invention.
Figure 2:
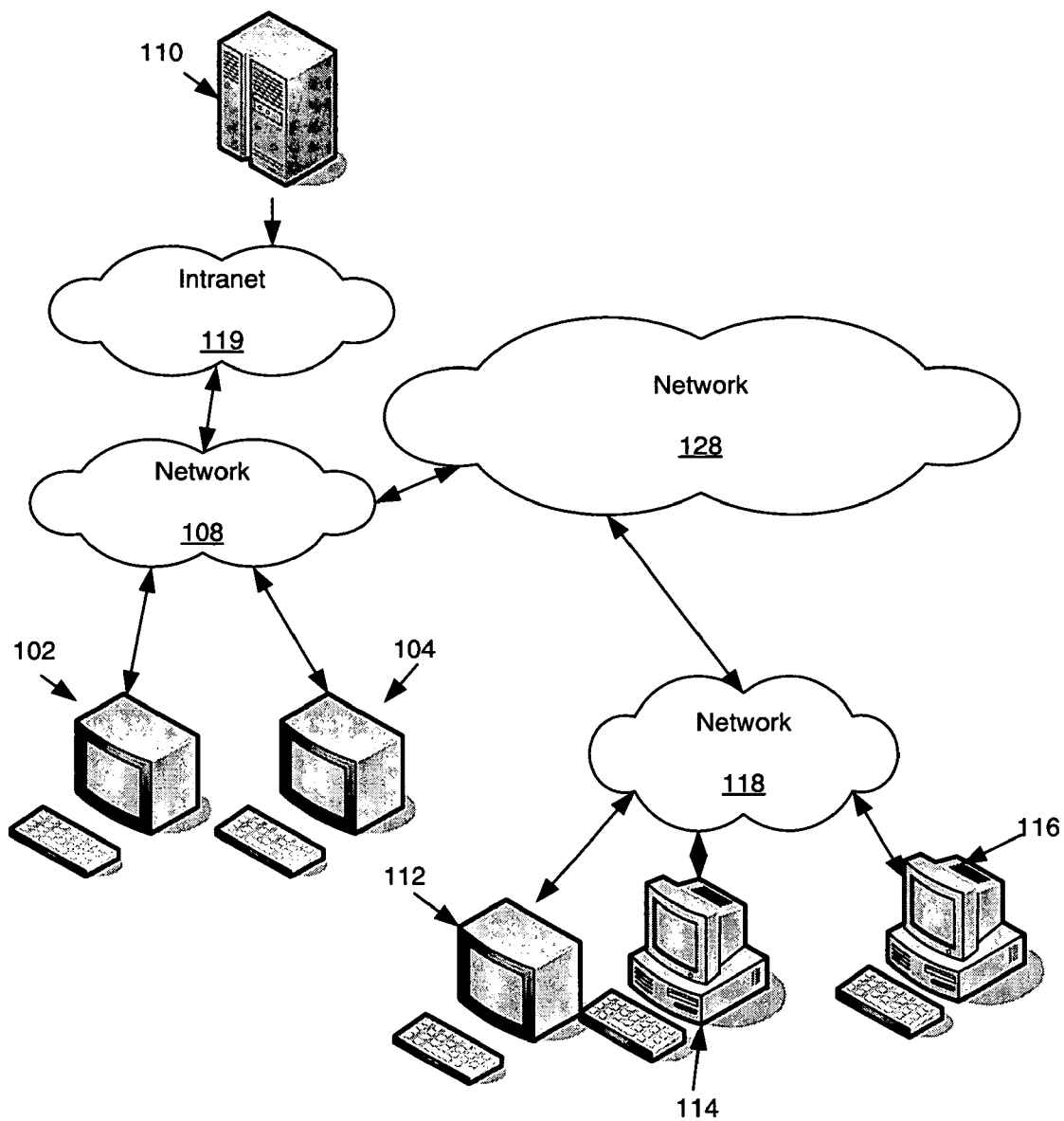
FIG. 2 illustrates a diagram of a computer system that may be used to implement various aspects of the invention.

FIG. 2 shows a diagram of a computer system and network that may be used to implement aspects of the invention. A plurality of computers, such as workstations 102 and 104, may be coupled to a computer 112, via a network 108, 128, and 118. Computers 112, 114, and 116 may be coupled to a network 128 through network 118. Computers 112, 114, and 116, along with workstations 102 and 104 may be used for the splitting of program execution among many CPUs. Those skilled in the art will realize that other special purpose and/or general purpose computer devices may also be connected to other various networks, such as the Intranet 119, and used for parallelization. Such additional devices may include handheld devices, multiprocessor systems, microprocessor-based or programmable consumer electronics, networked PCs, minicomputers, mainframe computers, and the like.

One or more of the computers and terminals shown in FIG. 2 may include a variety of interface units and drives for reading and writing data or files. One skilled in the art will appreciate that networks 108, 118 and 128 are for illustration purposes and may be replaced with fewer or additional computer networks. One or more networks may be in the form of a local area network (LAN) that has one or more of the well-known LAN topologies and may use a variety of different protocols, such as Ethernet. One or more of the networks may be in the form of a wide area network (WAN), such as the Internet. Computer devices and other devices may be connected to one or more of the networks via twisted pair wires, coaxial cable, fiber optics, radio waves or other media.

Exemplary Embodiments

In various embodiments of the invention, a first set of preclassification steps may be implemented prior to classification. These preclassification steps may increase classification or learning speed of any binary classifier. These preclassification steps may be duplicated for each processor and may suggest a limit to the granularity of parallelization.

In a first aspect of the invention, merging of identical examples may increase learning speed. As learning time scales linearly or quadratically with the number of training examples, this can result in learning time speedups which range from two to four.

The problem is efficient detection of similar examples. If N is the total number of examples, pairwise comparisons would require $O(N^2)$ operations, which is not acceptable in most systems. However, one may define a strict order relationship that can be used to sort the examples using the Quick Sort or the Heap Sort routines, which tend to scale as $O(N \log(N))$.

Figure 3:
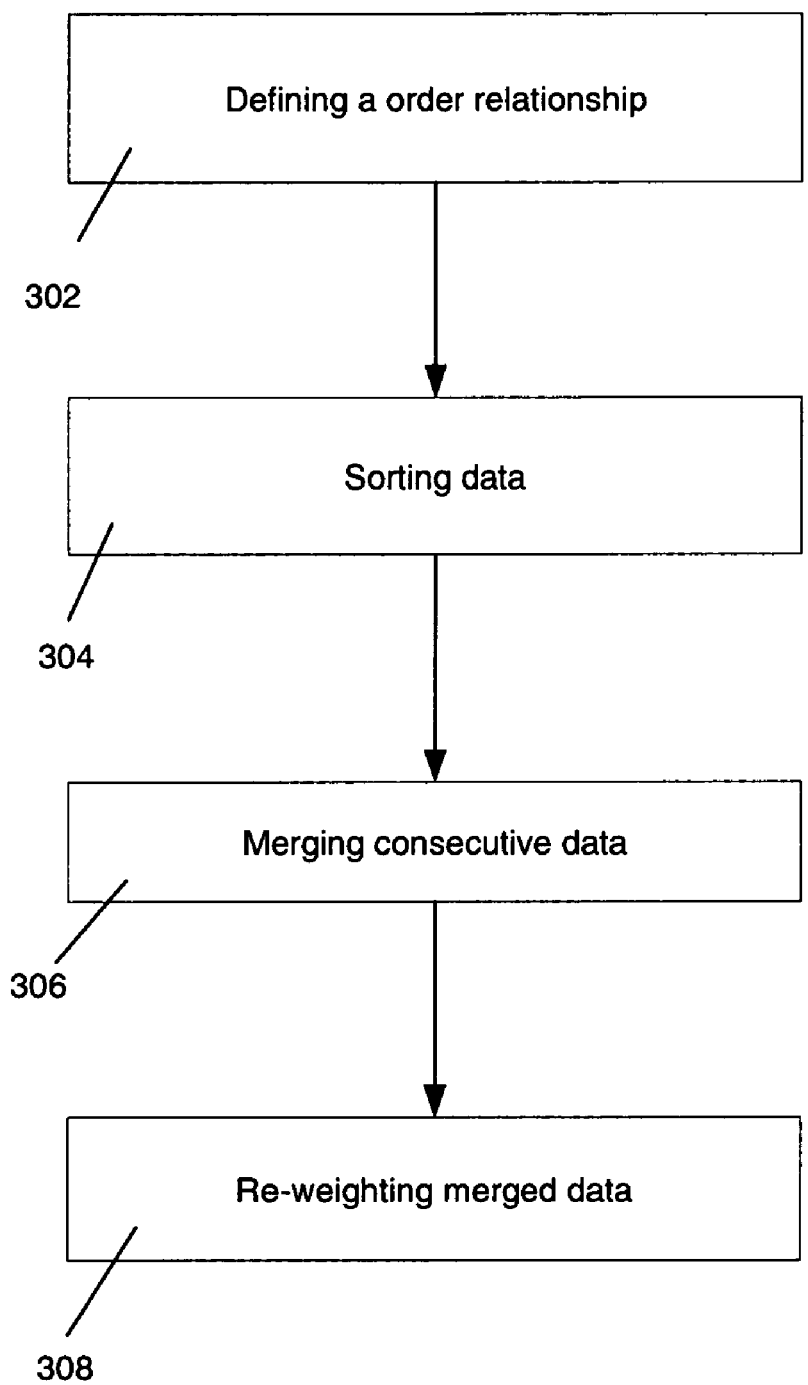
FIG. 3 illustrates a flow diagram for preprocessing data to increase learning speed for multiclass classifications in accordance with an aspect of the invention.

The method includes defining an order relation on the input examples as shown in FIG. 3. In a first step 302, an order relation is defined. An order relation is a comparison between objects, which satisfies the properties of reflexivity, antisymmetry and transitivity. Examples of order relations include "is larger than or equal to" and "is a divisor of" between integers, and the relation "is an ancestor of" between people (if we set the convention that every individual is an ancestor of itself).

Most often, each data sample is represented by a finite list of scalar features. For sample x, we note these features $f_1(x), \ldots, f_n(x)$, and say that x>y if and only if there exists i so that for all j<i, $f_j(x)=f_j(y)$ and $f_i(x)>f_i(y)$. It is easy to show that its negative, x<=y, is an order relation.

Once the order is defined, in a step 304 the order relation may be used to apply a sorting routine such as Quick Sort to all the training examples (complexity $O(N \log(N))$).

Next in step 306, the sorted list of the training example may be analyzed and consecutive examples which are equal may be merged together. A training example which results in the merging of N original examples must have its importance reweighed in step 308. After these adjustments, training on the compressed set of examples produced the same results as training on the full set, while being considerably faster.

In another aspect of the invention, transposing the data representation may increase learning speed. The usual representation of the data is transposed. Data is represented as a set of features, each feature being a sparse list of examples (instead of a set of examples, each examples being a list of features). This transposed data representation enables considerable speedups when the data is sparse, both in the case of the SVMs and in the case of Maxent/Adaboost.

In another aspect of the invention, sharing cache may increase learning speed. The most efficient way to speedup SVM learning is to cache kernel products that have already been computed. (For additional information see; T. Joachims. Making large-scale SVM learning practical. In Advances in Kernel Methods—Support Vector Learning, 1998.) When learning is applied to a sequence of binary classifiers (on a single processor), the cache already computed for all previously trained classifiers can be used for the current classifier, and avoid expensive recalculation or recomputation of kernel products.

Figure 4:
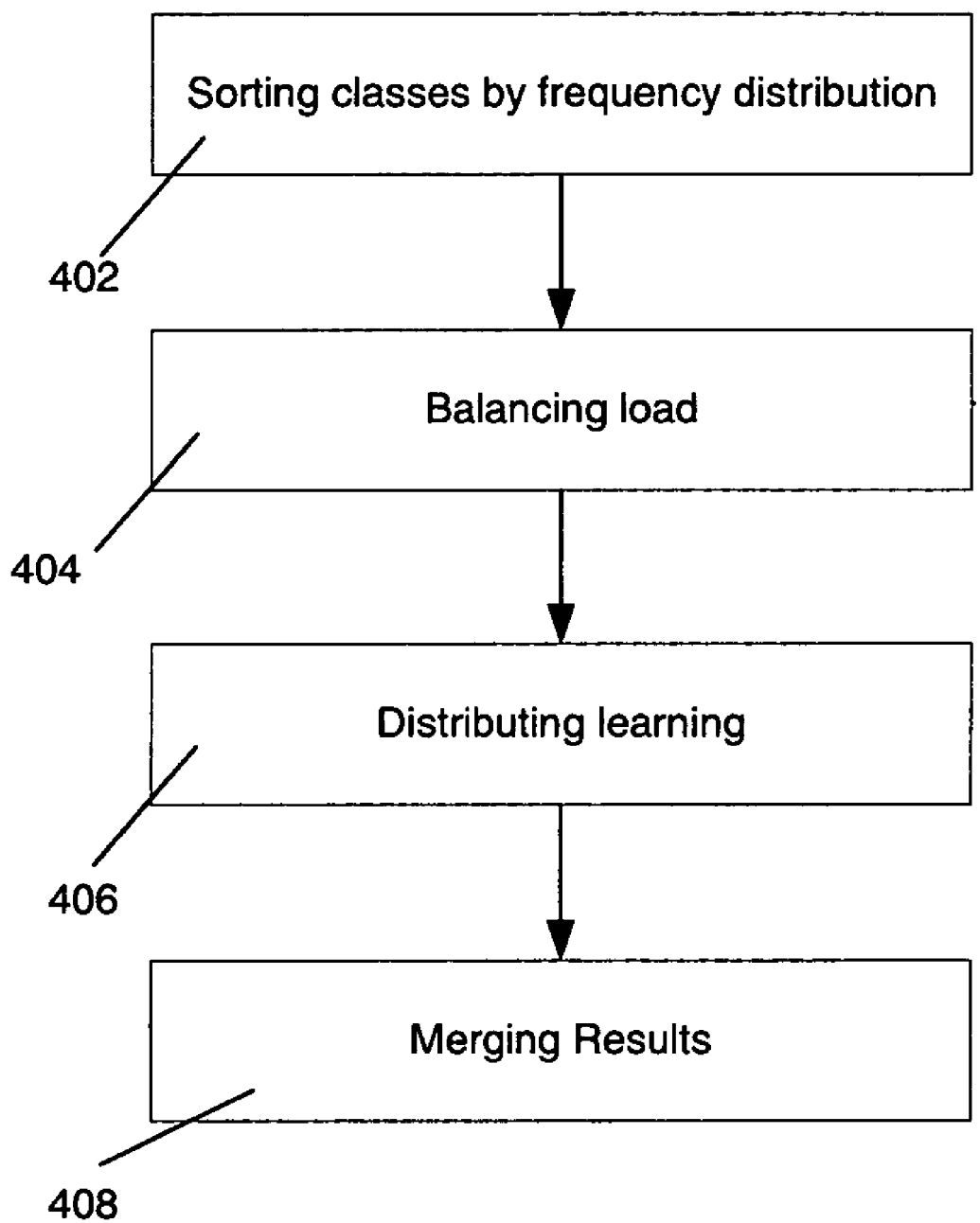
FIG. 4 illustrates a flow diagram for increasing learning speed for multiclass classifications using parallelization in accordance with an aspect of the invention.

In another aspect of the invention, parallelization may increase learning speed. The following methods allow for an improved parallelization process. For instance, multiclass implementations with independent 1-vs-other classifiers allow for an easy parallelization. These parallelization methods do not require communication between the computing units. The parallelization methods are applicable to multiclass models where the training process may be split into the training of independent classifiers. In an exemplary method illustrated in FIG. 4, the classes are sorted their frequency distribution in a step 402. Next, in step 404 load balancing may be preformed by implementing a Round Robin on the sorted list into S groups of classes. For instance, in the case where N can be decomposed as (M+1)×S, we have Classes 1, S+1, . . . , M×S+1 go to subset 1,
Classes 2, S+2, . . . , M×S+2 go to subset 2,
Classes S, S+S, . . . , M×S+S go to subset S.

The frequency distribution of each group should be similar which may lead to similar training times. Learning can then be distributed over S processors in step 406. Those skilled in the art will realize that numerous processors may be used and that such processors may be remote and located in various different locations.

Next in step 408, the results of the S learning processes are merged. The gain by parallelizing into S subsets may be up to S times faster. This parallelization technique may be used for Adaboost, SVMs and Maxent the training times for each of the class subsets were very similar. In addition, this parallelization method may also be used for 1-vs-1 and hierarchical combinations of binary classifiers. However, the load balancing step 404 should take into account class sizes.

In another aspect of the invention, another exemplary method may be used for an improved parallelization process. In the case of SVMs, a more efficient but much harder to implement parallelization strategy is possible. A cascading approach where the training data is split into a hierarchical fashion has been proposed which may reduce the number of examples each sub-learning task had to handle. (See; Hans Peter Graff, Eric Cosatto, Leon Bottou, and Igor Durdanovic. Parallel Support Vector Machines: The Cascade SVM. In Advances in Neural Information Processing Systems 17, 2005.)

Figure 5:
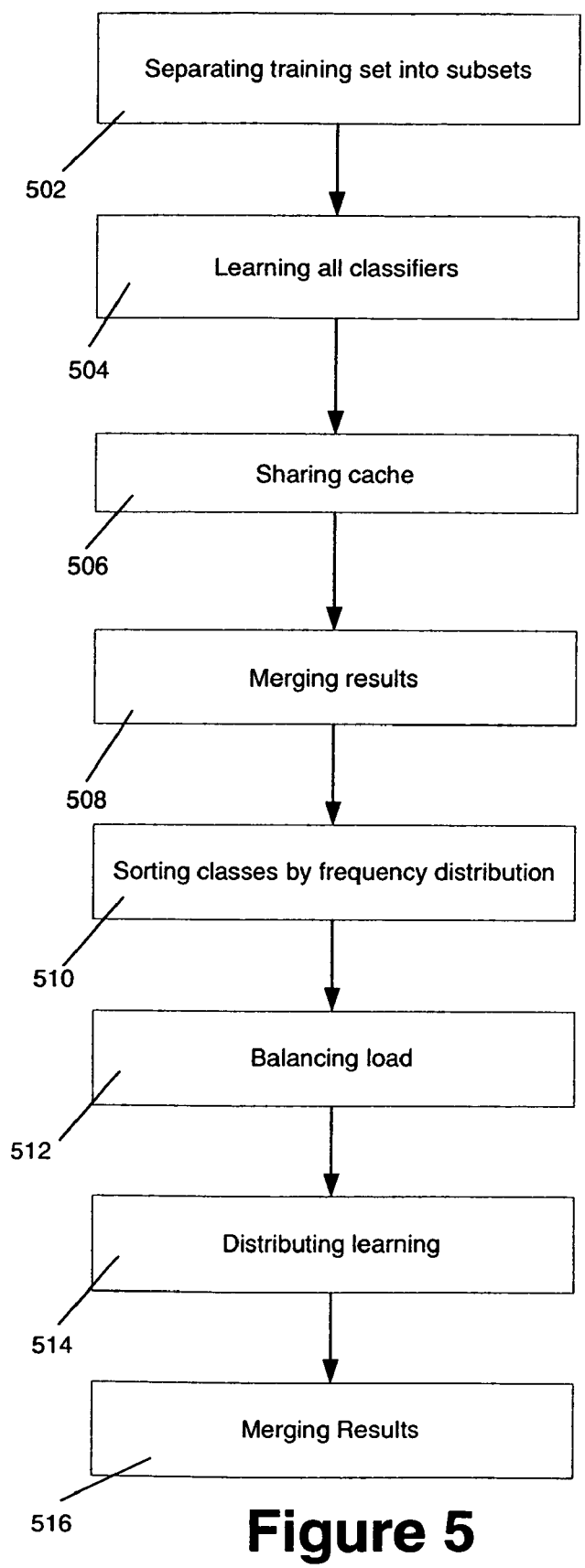
FIG. 5 illustrates another flow diagram for increasing learning speed for multiclass classifications using parallelization in accordance with an aspect of the invention.

The following method implements a unique new version of this cascading approach, which is refereed to as splitting. In this method in a first step, a split may be made along examples. Then in a second step, a split may be made along classes. This method is illustrated in FIG. 5. In the first split along examples, the training set may be split into S subsets of equal size as shown in step 502. Next in step 504, each S processor may learn all the classifiers on one of the subsets. To learn all the classifiers using the same processor allows optimization of kernel cache sharing between classifiers. Gain by paralyzing into S subsets may be up to $S^2$ faster. In step 506, if there is enough memory available, kernels which have been computed for the learning of one classifier can be used for the next classifiers to be learned. Next in step 508, merge the S sets of support vectors to from the training set for the complete SVM. Finally, the reduced training set may be used to retrain the complete SVM by sorting along the classes. As shown in FIG. 5, the classes are sorted their frequency distribution in step 510. Next, in step 512 load balancing may be preformed by implementing a round robin on the sorted list into S groups of classes. Learning can then be distributed over S processors in step 514. Finally, in step 516 the results of the S learning processes may be merged.

In another aspect of the invention, parallelization may also be applied at runtime. Runtime as those skilled in the art will realize means use of the learning algorithm in the field. Resources are consumed in three basic operations which involve 1) Loading the parameters of the model (network and disk resources); 2) Loading and preprocessing of the data element to be classified (network and CPU); and 3) Applying the model to the preprocessed data (CPU resources).

Parallelization may be applied to 3) above, assuming that one has separate binary classifiers. It shall be noted that 2) above may be very time consuming and is shared between all the binary classifiers. Parallelization would require to duplicate 2) above on several processors, and if applied on a very fine grain, may result in a waste of resources.

In order to avoid wasted resources in an embodiment of the invention, one can select S sets so that the overheard induced is not too heavy. Next, the classifiers may be split into S sets, preferably using the same round-robin partition as during training. Finally, the runtime procedure may be applied to each of the processors.

While the invention has been described with respect to specific examples including presently preferred modes of carrying out the invention, those skilled in the art will appreciate that there are numerous variations and permutations of the above described systems and techniques that fall within the spirit and scope of the invention.

I claim:

1. A method for applying a model for an interactive voice response system comprising:
   a) receiving a training data set at a first computing unit;
   b) sorting classes of the training data set by frequency distribution at the first computing unit;
   c) distributing the sorted classes as a plurality of S groups across a plurality of S processors using a round robin partition, wherein each group includes classes different from classes in each other group, and each group is distributed to a different processor of the plurality of S processors, each of the S processors being located within a different computing unit;
   d) for each processor, processing the distributed group of sorted classes to produce learning data;
   e) for each processor, distributing the learning data to each of the other processors;
   f) merging results of the processing into a model at a second computing unit; and
   g) outputting the model to cache operatively connected to the second computing unit; and
   h) applying the model to an interactive voice response system.

2. The method of claim 1, wherein prior to b), the method further comprises determining if at least two training data in the training data set are identical, and merging identical data.

3. The method of claim 2, wherein merging identical data includes:
   defining an order relationship for all data of the identical data;
   sorting all of the data by the defined ordered relationship;
   merging consecutive data that are equivalent; and
   re-weighting the merged consecutive data.

4. The method of claim 3, wherein sorting all of the data includes a quick sort sorting routine.

5. The method of claim 1, wherein prior to b) the method further comprises transposing the training data set.

6. The method of claim 1, wherein prior to b) the method further comprises storing in cache memory previously processed classes of the training set data for each of the plurality of S processors.

7. The method of claim 1, wherein the frequency distribution of sorted classes within the groups is similar.

8. A method for applying a model for an interactive voice response system comprising:
   a) receiving a training data set at a first computing unit;
   b) splitting the training data sets along examples at the first computing device;
   c) splitting the split training data sets from a) along classes at the first computing device;
   d) separating the split training data sets from c) as a training set S into S subsets of equal size at the first computing device;
   e) distributing the S subsets in d) across a plurality of S processors, wherein one subset is distributed to one processor, each of the S processors being located within a different computing unit;
   f) for each of the plurality of S processors, determining all the classifiers of the distributed subset;
   g) merging results of the processing into a model at a second computing unit;
   h) outputting the model to cache operatively connected to the second computing unit; and
   i) applying the model to an interactive voice response system.

9. The method of claim 8, wherein the method further comprises determining if at least two training data in the training data set are identical, and merging identical data.

10. The method of claim 8, wherein the method further comprises transposing the training data set.

11. The method of claim 8, the method further comprises storing in cache memory previously processed classes of the training set data for each of the plurality of S processors.

* * * * *